United States Patent Office.

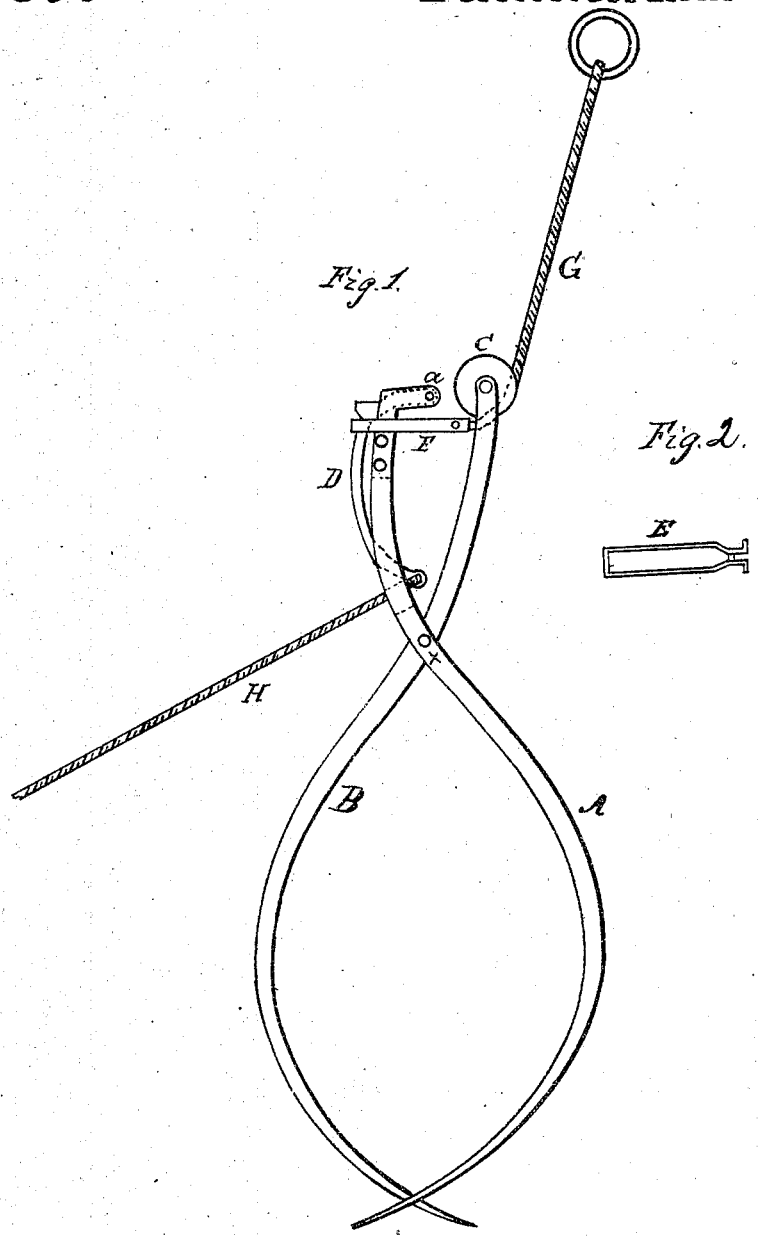

WILLIAM SCHOLL, OF MARION TOWNSHIP, PENNSYLVANIA.

Letters Patent No. 75,800, dated March 24, 1868.

IMPROVEMENT IN HORSE HAY-FORKS.

The Schedule referred to in these Letters Patent and making part of the same.

TO ALL WHOM IT MAY CONCERN:

Be it known that I, WILLIAM SCHOLL, of Marion township, in the county of Berks, and in the State of Pennsylvania, have invented certain new and useful Improvements in Horse Hay-Forks; and do hereby declare that the following is a full, clear, and exact description thereof, reference being had to the accompanying drawings, and to the letters of reference marked thereon.

In the annexed drawings, making part of this specification, A and B represent two long curved tines, which are pivoted together, as seen at $x$, a short distance from their upper ends, so that their lower ends will operate together like grappling-tongs. Pivoted in the upper end of tine B is a pulley, C, and in tine A is a peculiarly-shaped lever, D, having a lug or projection on it at $e$. The lever is pivoted at one end, while the other end plays freely, and is provided with a cord, H, by means of which it is operated. E represents a loop or link, which is slipped over the upper end of tine A, passing over the lever D at the same time, and catching against the projection $e$. In one end of this link is secured a cord, G, which passes under pulley C. This cord also passes up to the top of the barn or mow, and around a pulley stationed there, and then down to near the bottom of the mow and around a pulley there, so that a horse may be applied or secured to one end for drawing up the hay.

It will readily be seen that when the link E is caught over the tine B, and power is applied to the cord G at its other end, the tines will be brought together at their lower ends, so as to embrace tightly any hay or straw which may be placed between them.

As soon as the fork has been drawn up as high as desirable, the operator, by drawing the cord H, throws the lower end of lever H up, so as to disengage the loop E from the projection $e$, thus separating said loop from the end of tine A, and allowing the lower ends of the tines to separate and discharge the hay which is embraced between them. By slacking up the cord G, the fork again descends, and being supplied with hay is set by loop E, drawn up, and then discharged as before.

Having thus fully described my invention, what I claim as new, and desire to secure by Letters Patent, is—

The curved lever D, bent and pivoted at its upper end, and provided with a projection, $e$, for securing the metal loop E, when used in combination with the tines A B and pulley C, with their cords, all constructed, arranged, and operating as set forth.

In testimony that I claim the foregoing, I have hereunto set my hand, this 13th day of January, 1868.

WILLIAM SCHOLL.

Witnesses:
   E. REED,
   D. STEERCH, JR.